(12) United States Patent
Ennabli et al.

(10) Patent No.: US 12,493,769 B2
(45) Date of Patent: Dec. 9, 2025

(54) RFID TAG FOR A TAMPER PROOF ATTACHMENT TO AN OBJECT SUCH AS A LICENCE PLATE

(71) Applicants: ASSA ABLOY AB, Stockholm (SE); LUX-IDent Germany GmbH, Sauerlach (DE)

(72) Inventors: Elies Ennabli, Lausanne (CH); Urs Furter, Noville (CH); Christian Mirus, Fribourg (CH); Hugo Kapp, Saint-Gingolph (FR); Michael Kober, Bruckmühl (DE)

(73) Assignees: ASSA ABLOY AB, Stockholm (SE); LUX-IDent Germany GmbH, Sauerlach (DE)

( * ) Notice: Subject to any disclaimer, the term of this patent is extended or adjusted under 35 U.S.C. 154(b) by 0 days.

(21) Appl. No.: 18/863,033

(22) PCT Filed: May 10, 2022

(86) PCT No.: PCT/EP2022/062686
§ 371 (c)(1),
(2) Date: Nov. 5, 2024

(87) PCT Pub. No.: WO2023/217358
PCT Pub. Date: Nov. 16, 2023

(65) Prior Publication Data
US 2025/0315638 A1    Oct. 9, 2025

(51) Int. Cl.
*G06K 19/06* (2006.01)
*G06K 19/073* (2006.01)
(Continued)

(52) U.S. Cl.
CPC . *G06K 19/07372* (2013.01); *G06K 19/07758* (2013.01); *G06K 19/07773* (2013.01); *H01Q 1/2208* (2013.01)

(58) Field of Classification Search
CPC ......... G06K 19/0723; G06K 19/07749; G06K 19/07372; G06K 19/07758;
(Continued)

(56) References Cited

U.S. PATENT DOCUMENTS

| 2002/0036237 A1* | 3/2002 | Atherton | ............ G06K 19/0739 |
| | | | 235/492 |
| 2007/0029384 A1* | 2/2007 | Atherton | ............... G06K 19/073 |
| | | | 340/572.7 |

(Continued)

FOREIGN PATENT DOCUMENTS

| EP | 2810828 | * 12/2014 | ....... G06K 19/07771 |
| EP | 2810828 A1 | * 12/2014 | ......... G06K 7/10009 |

(Continued)

OTHER PUBLICATIONS

"International Application Serial No. PCT EP2022 062686, International Search Report mailed Jan. 18, 2023", 4 pgs.
(Continued)

*Primary Examiner* — Daniel St Cyr
(74) *Attorney, Agent, or Firm* — Schwegman Lundberg & Woessner, P.A.

(57) ABSTRACT

An RFID tag comprising a lower housing, an upper housing and an antenna unit. The lower housing is configured to be attached to an object. The upper housing is placed on the lower housing and comprises a peripheral portion laterally surrounding the lower housing and configured to be attached to the object. The antenna unit is positioned between the lower housing and the upper housing. A first portion of the antenna unit is attached to the lower housing and a second portion of the antenna unit is attached to the upper housing. When the distance between the upper housing and the lower housing changes in case someone attempts to remove the RFID tag from the object, the at least one first portion of the antenna unit remains attached to the lower housing and the (Continued)

at least one second portion of the antenna unit remains attached to the upper housing.

20 Claims, 8 Drawing Sheets

(51) Int. Cl.
    *G06K 19/077*     (2006.01)
    *H01Q 1/22*     (2006.01)

(58) Field of Classification Search
    CPC ......... G06K 19/07722; G06K 19/0772; G06K 19/07773; H01Q 1/2225; H01Q 1/2208
    See application file for complete search history.

(56) References Cited

U.S. PATENT DOCUMENTS

| | | | |
|---|---|---|---|
| 2008/0030344 A1* | 2/2008 | Weller | B65D 27/00 340/572.8 |
| 2008/0143519 A1* | 6/2008 | Piotrowski | G06K 19/07372 340/540 |
| 2010/0176971 A1* | 7/2010 | Banerjee | G06K 19/07749 340/928 |
| 2016/0189022 A1* | 6/2016 | Raven | H04W 4/80 235/492 |
| 2017/0262747 A1* | 9/2017 | Robadey | G06K 19/07758 |
| 2021/0130009 A1* | 5/2021 | Yim | G06K 7/10376 |

FOREIGN PATENT DOCUMENTS

| | | | | |
|---|---|---|---|---|
| EP | 3040913 | | 7/2016 | |
| EP | 3343453 | * | 7/2018 | ....... G06K 19/07786 |
| EP | 3343453 A1 | * | 7/2018 | ....... G06K 19/07786 |
| WO | 2023217358 | | 11/2023 | |

OTHER PUBLICATIONS

"International Application Serial No. PCT EP2022 062686, Written Opinion mailed Jan. 18, 2023", 8 pgs.

\* cited by examiner

FIG 1
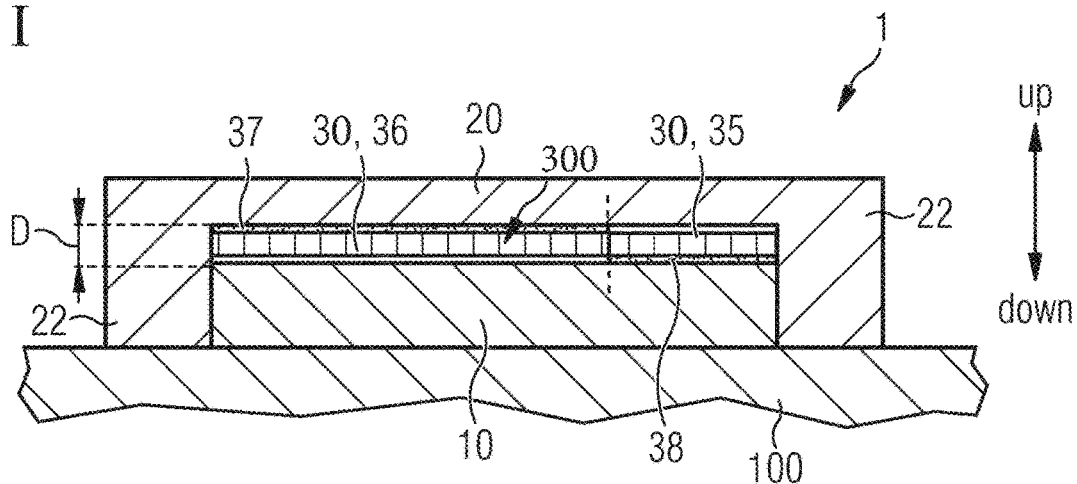
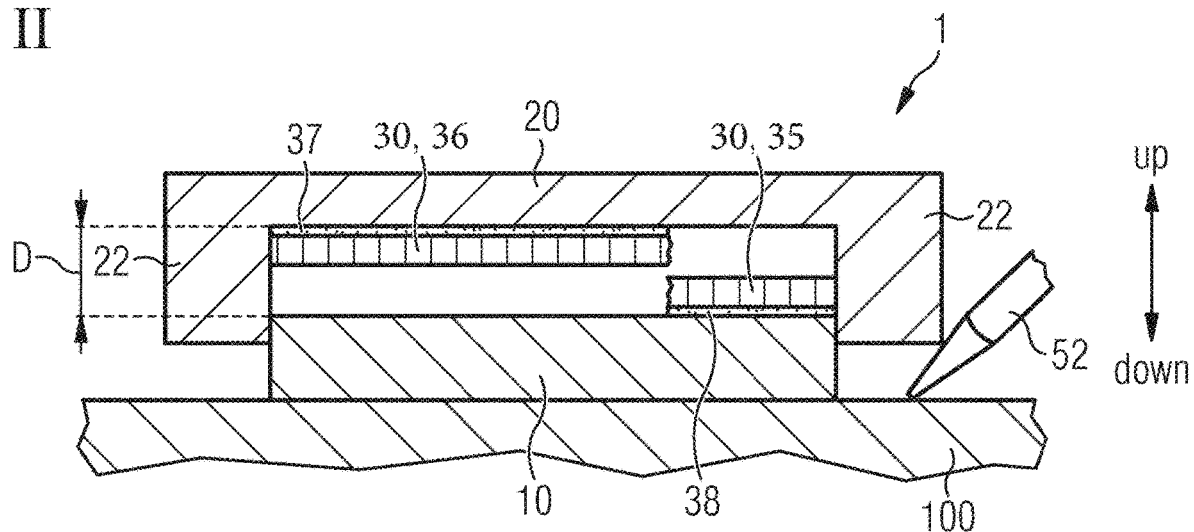

A-A

Detail D

Detail B

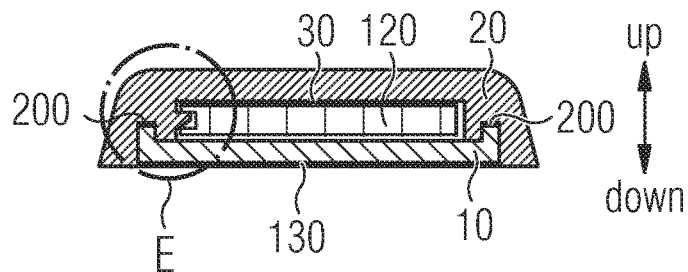
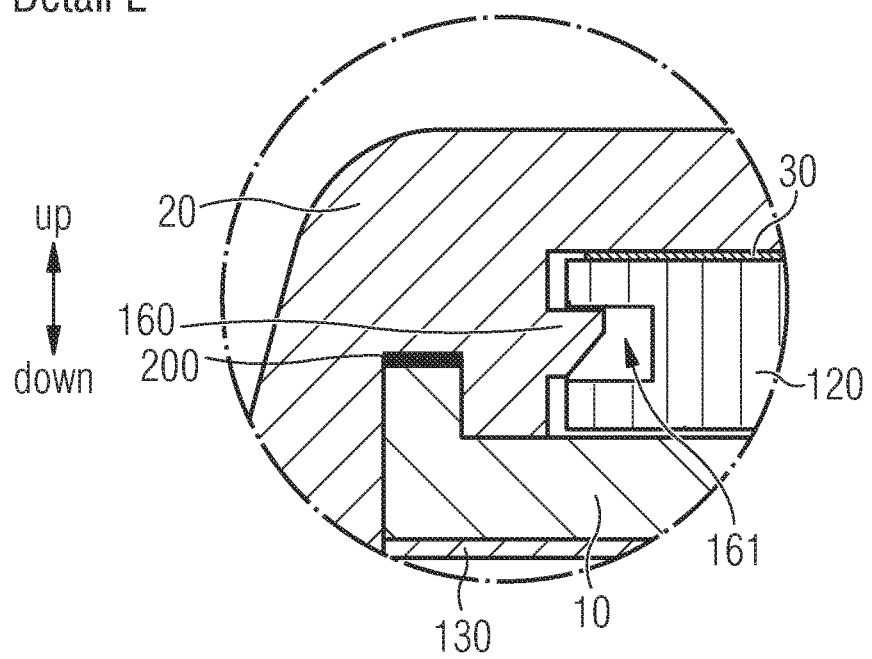

FIG 13
a)
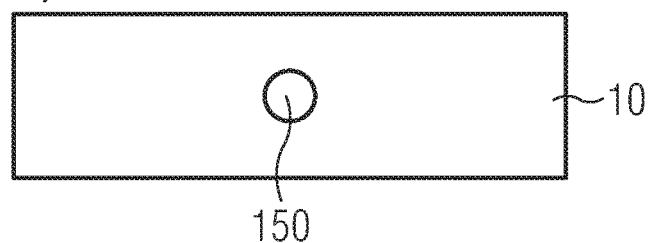
b)
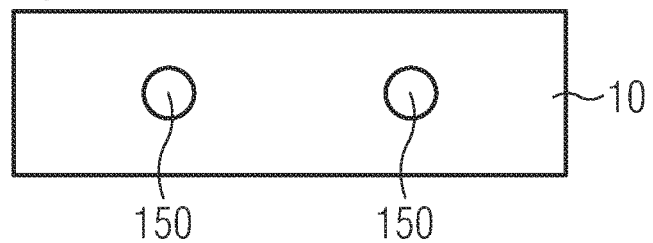
c)
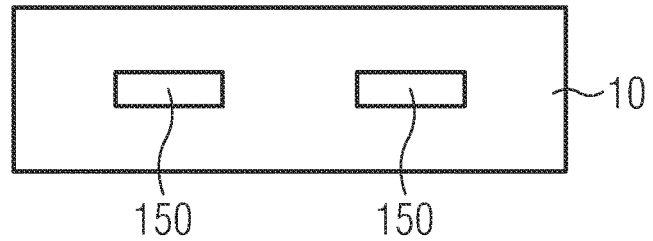

FIG 14
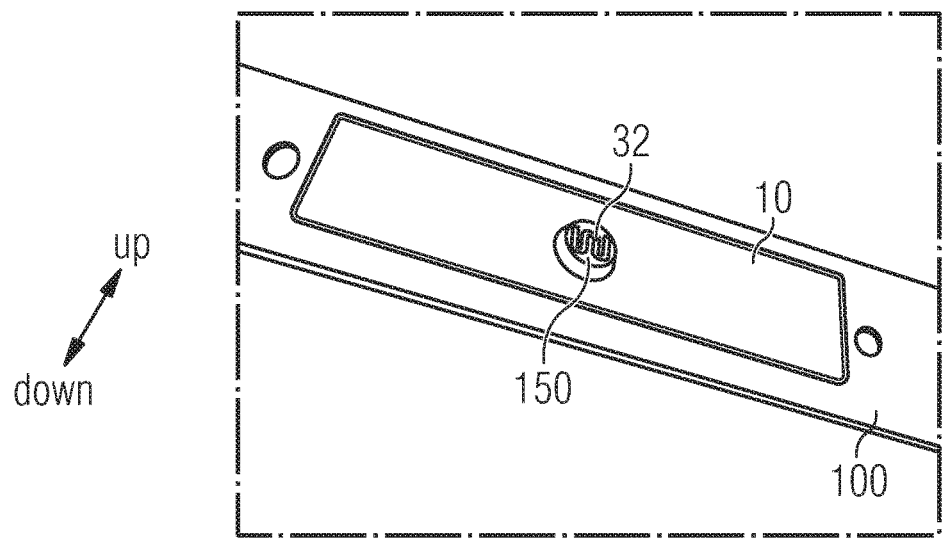
FIG 15
a)
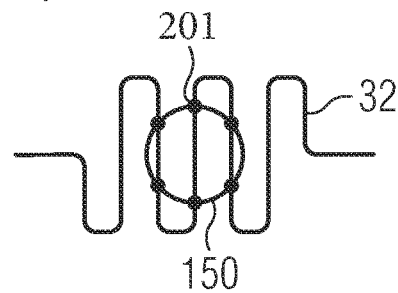
b)
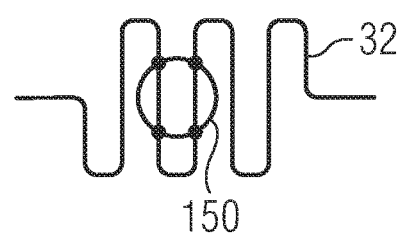
c)
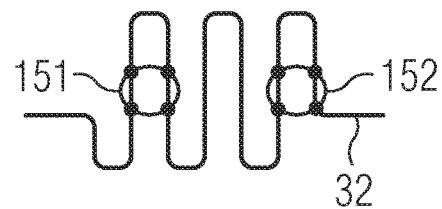

RFID TAG FOR A TAMPER PROOF ATTACHMENT TO AN OBJECT SUCH AS A LICENCE PLATE

CROSS-REFERENCE TO RELATED APPLICATION(S)

This application is a national stage application under 35 U.S.C. § 371 of PCT Appl. No. PCT/EP2022/062686, titled "RFID Tag for a Tamper Proof Attachment to an Object Such as a License Plate," filed May 10, 2022, which is incorporated herein by reference in its entirety.

TECHNICAL FIELD

The present disclosure generally relates to an RFID tag and in particular to an RFID tag for a tamper proof attachment to an object such as a license plate.

BACKGROUND

When RFID tags are attached to an object to identify that particular object, there is a need to prevent tampering and removal of the RFID tag from the object. And further that if the RFID tag is removed from the object, the RFID tag ceases to function.

Furthermore, RFID tags need to be cost effective, as traditionally RFID competes with barcodes which are already very cost effective. A known solution is to use an adhesive layer to attach the RFID tag to an object. As such adhesive layer for example the following product is used: ACX$^{plus}$ Acrylic Foam tape like 54804 from TESA as currently available on the market. If someone removes the RFID tag from the object by force, the adhesive layer is destroyed and the RFID tag is removed from the object without being able to be reattached using the same adhesive layer. The disadvantage of this solution is that the RFID tag can be re-attached to the object by using a new adhesive layer.

A further known solution is to use an RFID tag that includes a conductive wire, the wire is attached to a first pad of the RFID tag chip. When the RFID tag is attached to an object, the wire is now also attached to a second pad of the RFID tag chip, therefore a short circuit is present between the first and the second pad. The first pad, the second pad and the wire of the RFID tag are configured such that, when the RFID tag is removed from the object, the wire breaks. The RFID tag detects that the wire is broken by detecting that the circuit between the first and the second pad is now open and then sends this information wirelessly to the reader. The disadvantage of such RFID tag is the ability to re-connect the wire by welding or soldering techniques and thus having short circuit between the two pads again. As such RFID tag for example the following product is used: SEAL TAG EDTAMPER UHF UCODE G2IM+, P/N 6E5961 manufactured by HID Global (as currently available on the market).

A further known solution is to use an RFID inlay that contains an antenna to which the RFID chip is attached to, a substrate and an adhesion reducing layer between the antenna and the substrate. Such RFID inlay does not include a casing which protects the RFID inlay from outdoor weather conditions. Before the antenna such as an aluminium layer is etched on the substrate such as a PET substrate, the adhesion reducing layer is printed to the substrate. The adhesion reducing layer can be patterned on the substrate (chess-board pattern) or fully cover the substrate. Then the antenna is etched on the adhesion reducing layer. Due to the adhesion reducing layer, the antenna only fragilely adheres to the substrate. If the RFID inlay is attached to an object using strong enough adhesive, and someone tries to remove the RFID inlay from the object, the antenna comes loose and breaks because it only fragilely adheres to the substrate. At this point, the RFID inlay ceases to function. The disadvantage is that the RFID inlay is not well encapsulated by a robust casing and therefore the RFID inlay is not protected to outdoor weather conditions. A further disadvantage is that it is not certain that the antenna has come loose and break when the RFID inlay is removed from the object. Such RFID inlays for example are known from the company Lux-IDent (P/N L17-117013Z21-NU8-FR).

The present disclosure is directed, at least in part, to improving or overcoming one or more aspects of prior systems.

SUMMARY OF THE DISCLOSURE

According to one aspect of the present disclosure, an RFID tag for a tamper proof attachment to an object such as a license plate is disclosed. The RFID tag includes a lower housing, an upper housing and an antenna unit. The lower housing is configured to be attached to the object. The upper housing is placed on the lower housing and has a peripheral portion. The peripheral portion laterally surrounds the lower housing and is configured to be attached to the object. The antenna unit is positioned between the lower housing and the upper housing. At least one first portion of the antenna unit is attached to the lower housing and at least one second portion of the antenna unit is attached to the upper housing such that the antenna unit is damaged when the distance between the upper housing and the lower housing changes. The antenna unit is damaged because the at least one first portion of the antenna unit remains attached to the lower housing and the at least one second portion of the antenna unit remains attached to the upper housing when the distance between the upper housing and the lower housing changes.

The term "is damaged" as used in this disclosure also includes the meaning of "is broken" or "ceases to function".

By means of the RFID tag attached to the object, that particular object may be identified.

The RFID tag has an upper housing and a lower housing. The upper housing and the lower housing for example are made of Acrylonitrile butadiene styrene (ABS) or Polycarbonates (PC) or a mixture thereof. The upper housing and the lower housing are configured to be mated with each other and to accommodate an antenna unit which is positioned between the upper housing and the lower housing.

When the upper housing and the lower housing are mated with each other, an inner chamber is formed between the upper housing and the lower housing. The antenna unit is positioned within the inner chamber.

Both, the upper housing and the lower housing are configured to be attached to an object such as a license plate. The upper housing is placed on the lower housing. The upper housing has a peripheral portion which laterally surrounds the lower housing. Thus, when the upper housing and the lower housing are attached to the object, the lower housing is completely covered by the upper housing and the object. The lower housing is covered from the bottom by the object and it is covered from the top and the sides from the upper housing. Laterally surrounding in the sense of this disclosure refers to a complete lateral surrounding, but also includes embodiments in which the lower housing may not fully be surrounded by the peripheral portion. However, in that case, the upper housing still surrounds the lower housing to such extent that a person who tries to remove the RFID tag with a screwdriver or the like, may not reach the lower housing (may not have access to the lower housing) without having to raise the upper housing first. As a result, the lower housing is not reachable by a person who tries to remove the RFID tag without removing the upper housing first.

The upper housing may for example be fixed to the object by means of rivets in the peripheral portion. The bottom housing may for example be attached to the object by means of an adhesive layer. A person who tries to remove the RFID tag from the object at first would take out the rivets connecting the upper housing with the object. After having removed the rivets, the person then would remove the upper housing. As explained above, the lower housing is covered by the upper housing. Therefore, the person need to remove the upper housing before the lower housing can be removed. To remove the upper housing, the person might use a screwdriver (screwdriver tip blade) or the like. Only after the upper housing is removed, the person may reach the lower housing and may remove the lower housing with the screwdriver. If the person tries to remove both bottom and top housing simultaneously with a screwdriver, as explained before, this is not possible without destroying the antenna unit as the tip blade of the screwdriver must be inserted under the lower housing to lift it. However, as mentioned before, having the screwdriver tip blade inserted under the lower housing, the upper housing will inevitably be lifted first. Consequently, the antenna unit will be destroyed. Consequently, the RFID tag which is attached to an object cannot be removed from that object without removing the upper housing from the lower housing first. Removal of the upper housing means that the distance between the upper housing and the lower housing is increased. If the distance between the upper housing and the lower housing is increased, the lower housing can be reached or accessed by the use of a screwdriver or the like.

When the upper housing is removed from the lower housing, the distance between the upper housing and the lower housing is changed (increased). The distance refers to a distance in the up-down direction between an upper surface of the lower housing and a lower surface of the upper housing in the area in which antenna unit is positioned. The up-down direction corresponds to a direction perpendicular to the surface of the object the RFID tag is attached to. In other words, the up-down direction corresponds to the direction in which the upper housing is placed on lower housing.

The present disclosure is based at least in part on providing an RFID tag which is attachable to an object such as a license plate and which ceases to function if someone tries to remove it from that object. Further, the present disclosure is based on providing a cheap RFID tag with a well-encapsulated antenna unit which is protected against outdoor forces.

Antenna unit in the sense of this disclosure refers to any structure that includes an antenna, such as for example an RFID inlay or an RFID label. An RFID inlay has an antenna, a substrate and an integrated circuit. If an additional adhesive layer is added it is called a "wet RFID inlay". Otherwise, it is called a "dry RFID inlay". An RFID label is an RFID inlay embedded into a paper or thin film. According to a preferred embodiment, the antenna unit is damaged because the antenna of the antenna unit breaks when the distance between the upper housing and the lower housing changes (increases) when the upper housing is removed from the lower housing.

The upper housing and the lower housing form a "closed housing" which protects the antenna unit enclosed in its interior against any opening to the outside. The housing may for example protect the antenna unit from outside weather conditions such as high humidity. The upper housing and the lower housing are configured such that, when the RFID tag is attached to an object and someone tries to remove the RFID tag from that object, it is not possible to remove the RFID tag as a whole unit but the upper housing must be removed from the lower housing. That means that the "closed housing" must be opened when someone tries to remove the RFID tag from the object. When the housing is opened, the housing does not protect the antenna unit anymore as the antenna unit is now exposed to the outside. Consequently, the closed housing is destroyed when someone tries to remove the RFID tag from the object it is attached to.

In addition, the RFID tag is destroyed in respect to its radio frequency functionality. At least one first portion of the antenna unit is attached to the lower housing and at least one second portion of the antenna unit is attached to the upper housing. When someone tries to remove the RFID tag from the object, the upper housing is removed from the lower housing. Therefore, the distance between the upper housing and the lower housing is increased. The at least one first portion of the antenna unit remains attached to the lower housing and the at least one second portion of the antenna unit remains attached to the upper housing. As a result, the antenna unit breaks and ceases to function.

According to a further aspect of the present disclosure, a method is disclosed for providing a tamper proof attachment of an RFID tag to an object to be identified, such as a license plate. The method includes the step of providing a lower housing configured to be attached to the object to be identified and the step of providing an upper housing configured to be attached to the object and to be mated with the lower housing. In a mated state the lower housing and the upper housing form an inner chamber where the upper housing laterally surrounds the lower housing. The method further includes the step of mating the upper housing with the lower housing while positioning an antenna unit in the inner chamber between the upper housing and the lower housing and attaching at least one first portion of the antenna unit to the lower housing and at least one second portion of the antenna unit to the upper housing. The method further provides the step of attaching the lower housing and the upper housing, between which the antenna unit is positioned, to the object such that when someone tries to remove the RFID tag from the object, the upper housing has to be removed before the lower housing can be removed. Further, the lower housing and the upper housing are attached to the object such that, when the upper housing is removed from the object, the distance between the upper housing and the lower housing changes and the antenna unit breaks, because the at least one first portion of the antenna unit remains attached to the lower housing and the at least one second portion of the antenna unit remains attached to the upper housing.

According to an exemplary embodiment, the antenna unit of the RFID tag is an RFID inlay. The RFID inlay has an antenna and a substrate.

The substrate may be made of PET. The substrate may further include an adhesive. In that case, the RFID inlay may be attached to a body such as the upper housing or the lower housing by means of the substrate directly. Alternatively, the RFID inlay may further have an adhesive layer configured to attach the substrate of the RFID inlay to a body such as the upper housing or the lower housing. An example for an RFID inlay is the product P/N EDP-00358 WET UHF INLAY MONZA 4 QT-PET/OPP-123/13.5/0.1 MM TRANSP as currently available on the market. An example for an adhesive is the product AO530, Fasson® TT BG50 WHITE-S8049-BG50WH BSS (data sheet as of: June-2018). Another example for an adhesive tape is the product BU732 from Avery Dennison (data sheet as of: July-2021). According to a preferred embodiment, the antenna unit is damaged because the antenna of the RFID inlay breaks when the distance between the upper housing and the lower housing changes (increases) when the upper housing is removed from the lower housing.

According to an exemplary embodiment, the antenna unit of the RFID tag is an RFID inlay and the antenna of the RFID inlay is etched on the substrate.

For example, the RFID inlay may be produced by etching an aluminium layer on a PET substrate.

The RFID inlay may further have an adhesion reducing layer between the antenna and the substrate.

By using an adhesion reducing layer between the etched antenna and the substrate, the antenna can be peeled off from the substrate.

According to an exemplary embodiment, the RFID tag has a first adhesive layer (such as silicone sealant) positioned between the upper housing and the lower housing and attaching the upper housing to the lower housing. The upper housing is attached to the lower housing with the layer of silicone sealant. In addition, the silicone is a sealant means which protects the antenna unit against exterior elements, such as rain, humidity, and the like. Preferably, the housing is waterproof against rain. A groove may be positioned in the lower housing or the upper housing to accommodate the silicone. For the silicone the following product may be used: FX154-5 from Vitrochem Technology Pte Ltd as currently available on the market Silicone is just given as an example. Every product which has similar characteristics in attachment properties and in sealing properties compared to silicone may be used as well.

According to an exemplary embodiment, the RFID tag has a second adhesive layer which is configured to attach the lower housing to the object.

When the RFID tag is attached to the object, the second adhesive layer such as an adhesive tape is positioned between the lower housing and the object. For example, as second adhesive layer, the tape Mightyloc AFT 1080GF (datasheet as of January 2016) or the product 3M™ Laminating Adhesives 467MP or 468MP may be used. As further alternative, the tape Tesa® ACXplus 54804 Black Line (datasheet as of 26 Jul. 2018) may be used.

According to an exemplary embodiment, the first adhesive layer and the second adhesive layer are configured such that, when the RFID tag is attached to the object, the peel strength between the lower housing and the object is larger than the peel strength between the upper housing and the lower housing.

In this embodiment the lower housing is strongly attached to the object and the upper housing is attached weaker to the lower housing. Consequently, the upper housing can be removed from the lower housing while the lower housing remains attached to the object.

According to an exemplary embodiment the ratio of the peel strength between the lower housing and the object to the peel strength between the upper housing and the lower housing is in the range of 2 to 8, preferably in the range of 4 to 6.

Such ratio must be sufficient to ensure that the lower housing remains stuck to the object when the upper housing is removed from the lower housing.

For example, in an embodiment in which silicone sealant with a peel strength of 7 kN/m (the peel strength being defined by ASTM 3330,180°), is used to attach the upper housing to the lower housing and the width of the attachment zone of the upper housing (respectfully the lower housing) in contact with the silicone is 1 mm, the actual peel strength between the upper housing and the lower housing is 7 N. The same embodiment may use an acrylic based adhesive with a peel strength of 15 N/10 mm to 20 N/10 mm (the peel strength being defined by ASTM) 3330,180° to attach the lower housing to the object and the attachment zone of the lower housing (respectfully the object) in contact with the acrylic based adhesive has a width of 20 mm. Thus, the actual peel strength between the lower housing and the object is 30 N to 40 N.

According to an exemplary embodiment, each of the peel strength between the at least one first portion of the antenna unit and the lower housing and the peel strength between the at least one second portion of the antenna unit and the upper housing are greater than the breaking strength of the antenna unit such that the antenna unit breaks when the upper housing is separated from or attempted to be separated from the lower housing.

This configuration makes sure that the antenna unit breaks when someone tries to remove the RFID tag from the object. When a person tries to remove the RFID tag, the structure of the RFID tag causes that the distance between the upper housing and the lower housing is increased. The at least one first portion of the antenna unit remains attached to the lower housing and the at least one second portion of the antenna unit remains attached to the upper housing. As the breaking strength of the antenna unit is lower than the peel strength between the at least one first portion of the antenna unit and the lower housing and the peel strength between the at least one second portion of the antenna unit and the upper housing, the increase of the distance between the upper housing and the lower housing result in a break of the antenna unit.

According to an exemplary embodiment, the lower housing has a protrusion and the top of the protrusion is attached to the at least one first portion of the antenna unit.

The attachment of the first portion of the antenna unit to the lower housing is of crucial importance. According to this embodiment, the antenna unit is attached to the top of a protrusion. The surface area of the top of the protrusion is one factor effecting the peel strength between the antenna unit and the lower housing. By amending the size of the protrusion and thus the surface area of the top of the protrusion, the peel strength between the antenna unit and the lower housing can be amended. The protrusion may have a conic shape. This ensures a simplified placement of the upper housing on top of the lower housing.

According to an exemplary embodiment, the lower housing has multiple protrusions and the top of each protrusion is attached to the at least one first portion of the antenna unit. Preferably, the number of first portions of the antenna unit corresponds to the number of protrusions. Some or all of the multiple protrusions may have a conic shape.

The antenna unit breaks when the distance between the lower housing and the upper housing is changed. The use of multiple protrusions can provide an additional security in terms of brake of the antenna unit because it may be enough if only one of the multiple protrusion leads to a break of the antenna unit when the upper housing and the lower housing are separated. According to an exemplary embodiment, the antenna unit includes an antenna which in top view enters and exits the area which is positioned above the top of the one ore more protrusions at least one time and not more than two times.

If the antenna enters and exits the area which is positioned above the top of the one or more protrusions one time, this means that the antenna both enters this area one time and exits this area one time. In other words, in this case two bridging antenna sections exist, i.e. potential breakage points. In an exemplary embodiment the antenna enters and exits the area which is positioned above the top of the one or more protrusions two times. Accordingly, the antenna enters this area two times and exits this area two times, and, consequently, four bridging antenna sections and four potential breakage points exist. The antenna unit breaks when someone tries to remove the RFID tag from the object. Depending on the number of entries and exits of the antenna of the antenna unit into the area respectively out of the area which is positioned above the top of the one or more protrusions, the breaking strength of the antenna unit may be amended. Spoken in simplified terms, if the antenna enters and exits the area for example six times, which is positioned above the top of the one or more protrusions in top view, the antenna will resist six more times before can break, than if number of entries and exit is only one. The number of one to two entries and exits has been proven to provide a suitable breaking strength of the antenna.

The antenna may for example extend in a meander form. Preferably, the area which is positioned above the top of the one or more protrusions in top view corresponds to the at least one first portion of the antenna unit.

According to an exemplary embodiment, the RFID tag further has an RFID inlay holder. The second portion of the antenna unit is attached to the RFID inlay holder. The RFID inlay holder is attached to the upper housing.

To attach the second portion of the antenna unit to the upper housing, the antenna unit is attached to an inlay holder and the inlay holder is attached to the upper housing. The RFID inlay holder may be attached to the upper housing by means of a clip mechanism. For the attachment of the inlay holder to the upper housing other attachment means may be used as well. For example, the inlay holder may be attached to the upper housing by means of glue.

According to an exemplary embodiment, the antenna unit is positioned on the top side of the RFID inlay holder, is folded at an outer edge of the RFID inlay holder and protrudes on the lower side of the RFID inlay holder.

In this embodiment, to make sure that the antenna unit does not separate from the RFID inlay holder, the antenna unit is folded around the RFID inlay holder which is attached to the upper housing.

According to an exemplary embodiment, the RFID inlay holder has a through hole through which the protrusion of the lower housing extends.

This configuration provides a simple structure with two components, the protrusion and the RFID inlay holder, to which the antenna unit may be connected. When the distance between the upper housing and the lower housing is changed, the two components allow a displacement relative to each other in the up-down direction. The RFID inlay holder may have multiple throughholes. The number of throughholes corresponds to the number of protrusions of the lower housing.

The one or more protrusions preferably extend in a vertical direction through the through hole of the RFID inlay holder. Preferably, the top of the protrusion extends through the throughhole of the RFID inlay holder such that an upper surface of the RFID inlay holder and the top of the protrusion are positioned on the same level in up-down direction. Thus, a plane consisting of the upper surface of the RFID inlay holder and the top of the protrusion is provided on which antenna unit can be positioned. The antenna unit is attached to the RFID inlay holder and to the top of the protrusion, the top of the protrusion extending through the through hole of the RFID inlay holder.

According to an exemplary embodiment, the peripheral portion has a bottom surface with a width not smaller than 2 mm, the width being measured perpendicular to the up-down direction.

Other features and aspects of the present disclosure will be apparent from the following description and the accompanying drawings.

BRIEF DESCRIPTION OF THE DRAWINGS

FIG. 1 shows an RFID tag 1 which is attached to an object 100 in a simplified sectional view in closed state (I) and in open state (II).

FIG. 9 is a cross-sectional view along line C-C of the RFID tag 1 of FIG. 5.

FIG. 10 is a detailed view of section E of the RFID tag 1 as marked in FIG. 9.

FIG. 13 schematically illustrates three different exemplary embodiments for the form and number of protrusions 150 of the lower housing 10 in top view.

FIG. 14 is a perspective view of a damaged RFID tag 1 from which the upper housing 20 has been removed.

FIG. 15 schematically illustrates three different exemplary embodiments for the form of the antenna 32 and its positioning in relation to the top of the one or more protrusions 150, 151, 152 of the lower housing 10 in top view.

DETAILED DESCRIPTION

Figure 2:
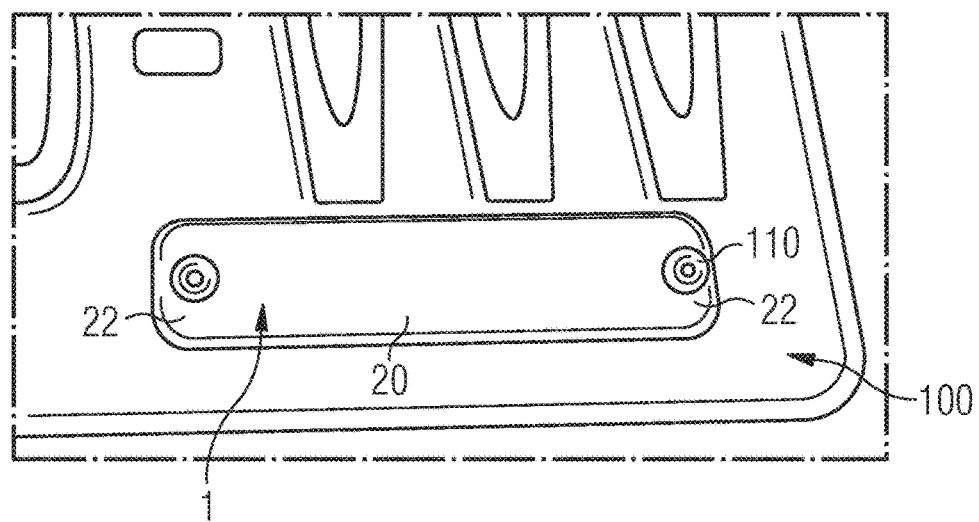
FIG. 2 shows an RFID tag 1 according to an exemplary embodiment in top view which is attached to a license plate 100.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

FIG. 1 shows an RFID tag 1 which is attached to an object 100 in a simplified sectional view in closed state (I) and in open state (II).

FIG. 1 illustrates in I a state in which the upper housing 20 is placed on the lower housing 10. The lower housing 10 is attached to the object 100. The lower housing 10 may for example be attached to the object 100 by means of an adhesive layer (not shown in FIG. 1). The upper housing is attached to the object 100. The upper housing may for example be attached to the object 100 by means of rivets (not shown in FIG. 1). The upper housing 20 has a peripheral portion 22 which laterally surrounds the lower housing 10. An antenna unit 30 is positioned between the lower housing 10 and the upper housing 20. The antenna unit 30 has a first portion 35 and a second portion 36 (dotted line in FIG. 1 marks separation point of first portion 35 and second portion 36). The first portion of the antenna unit 35 is attached to the lower housing 20 by using a connecting means 38 such as an adhesive layer. The second portion of the antenna unit 36 is attached to the upper housing 10 by using a connecting means 37 such as an adhesive layer. The upper housing 20 and the lower housing 10 form an inner chamber 300 in which the antenna unit 30 is positioned.

FIG. 1 illustrates in II a state in which the upper housing 20 is moved away (lifted) from the lower housing 10 by means of a screwdriver 52. In that case, the attachment means of the upper housing 20 to the object 100 such as rivets have already been removed. Due to the upward movement of the upper housing 20, the distance D between the upper housing 20 and the lower housing 10 is increased. The distance D is the distance from an upper surface of the lower housing 10 to a lower surface of the upper housing 20 in up-down direction in the area where the antenna unit 30 is positioned. The first portion of the antenna unit 35 remains attached to the lower housing 10 and the second portion of the antenna unit 36 remains attached to the upper housing 20. The antenna unit 30 is broken.

FIG. 2 shows an RFID tag 1 according to an exemplary embodiment in top view which is attached to a license plate 100. The RFID tag 1 is attached to a license plate 100 by means of two rivets 110 positioned in the peripheral portion 22 of the upper housing 20.

Figure 3:
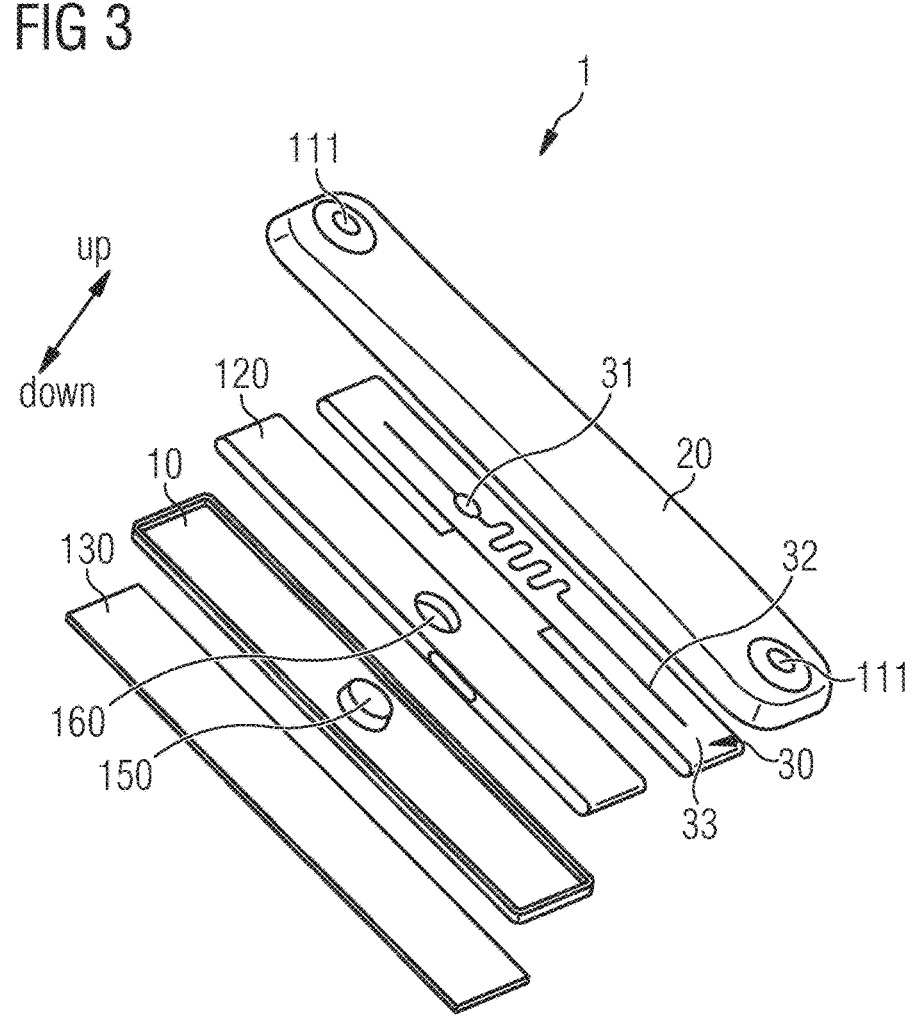
FIG. 3 shows the RFID tag 1 of FIG. 2 in an exploded view.

FIG. 3 shows the RFID tag 1 of FIG. 2 in an exploded view. Listed from the bottom to the top in the up-down direction, the RFID tag has an adhesive tape 130, a lower housing 10, an RFID inlay holder 120, an antenna unit 30 and an upper housing 20. The adhesive tape 130 is configured to attach the lower housing 10 to the license plate 100 (the license plate is not shown). The adhesive tape 130 is an optional component which might be omitted in other exemplary embodiments of the RFID tag. The lower housing 10 comprises a protrusion 150 extending in upward direction. The RFID inlay holder 120 has an RFID inlay holder through hole 160 which is positioned in the RFID inlay holder 120 such that in a assembled state, the protrusion 150 of the lower housing 10 extends through the RFID inlay holder through hole 160.

The antenna unit 30 has an integrated circuit 31, an antenna 32 and a substrate 33, the substrate holding the integrated circuit 31 and the antenna 32. The upper housing 20 is the outermost component of the RFID tag 1 and covers the other before mentioned components in an assembled state. In an assembled state, when the RFID tag 1 is attached to an object such as a license plate 100, only the upper housing 20 is visible. The other components are covered from the upper housing 20 from the top and the side and from the license plate 100 from the bottom.

Figure 4:
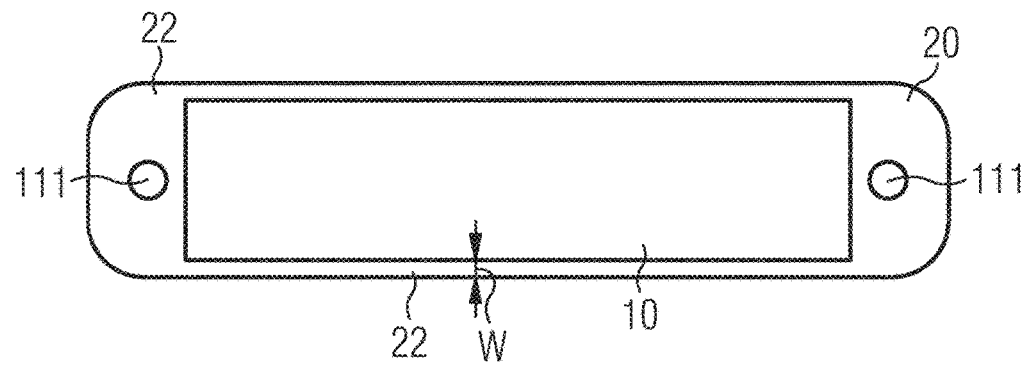
FIG. 4 shows the RFID tag 1 of FIG. 2 in bottom view.

FIG. 4 shows the RFID tag 1 of FIG. 2 in bottom view. The adhesive tape 130 is not shown. The upper housing 20 has a peripheral portion 22 which surrounds the lower housing 10. The peripheral portion 22 has two through holes 111 configured to receive an attachment means such as a rivet for attachment of the upper housing 20 to an object such as a license plate 100. The peripheral portion 22 has a minimal width W, the minimal width W being measured at the lower side of the upper housing 20.

Figure 5:
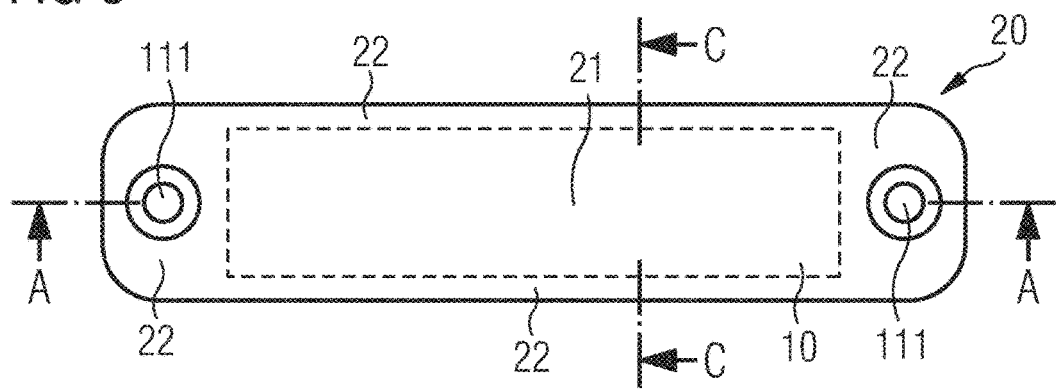
FIG. 5 shows the RFID tag 1 of FIG. 2 in top view.

FIG. 5 shows the RFID tag 1 of FIG. 2 in top view. The upper housing 20 has a central portion 21 which is positioned on top of the lower housing 10 in the area where the antenna unit 30 is positioned. The upper housing 20 has a peripheral portion 22 which surrounds the lower housing 10. The lower housing 10 is illustrated with a dashed line as it is covered by the upper housing 20. The peripheral portion 22 has two through holes 111 configured to receive an attachment means such as a rivet for attachment of the upper housing 20 to an object such as a license plate 100.

Figure 6:
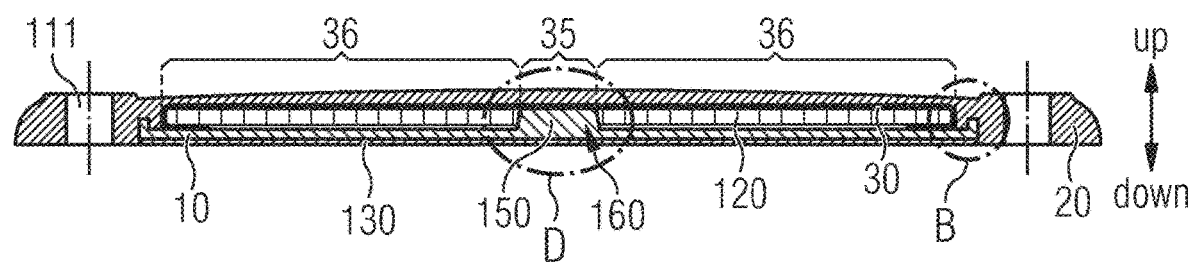
FIG. 6 is a cross-sectional view of the RFID tag 1 of FIG. 5 along line A-A.

FIG. 6 is a cross-sectional view of the RFID tag 1 of FIG. 5 along line A-A. The lower housing 10 has a protrusion 150. At the bottom of the lower housing 10 an adhesive tape 130 is attached. The upper housing 20 is positioned on top of the lower housing 10 and has a peripheral portion which surrounds the lower housing 10. The peripheral portion has two through holes 111.

An antenna unit 30 is positioned between the lower housing 10 and the upper housing 20. The antenna unit 30 has a first portion 35 and a second portion 36. The first portion 35 is attached to the top of the protrusion 150. The antenna unit 30 is an RFID inlay.

An RFID inlay holder 120 is positioned between the lower housing 10 and the upper housing 20. The RFID inlay holder 120 has an RFID inlay holder through hole 160 through which the protrusion 150 extends. The top of the protrusion 150 is attached to the first portion of the antenna unit 35. The second portion of the antenna unit 36 is attached to the RFID inlay holder 120. The antenna unit 30 is positioned on the top side of the RFID inlay holder 120, is folded at outer edges of the RFID inlay holder 120 and protrudes on the lower side of the RFID inlay holder towards the centre of the RFID tag 1. The antenna unit 30 is folded at outer edges of the RFID inlay holder 120 and extends on the upper side and the lower side of the RFID inlay holder 120. In other embodiments the antenna unit 30 may extend only on the upper side of the RFID inlay holder.

Figure 7:
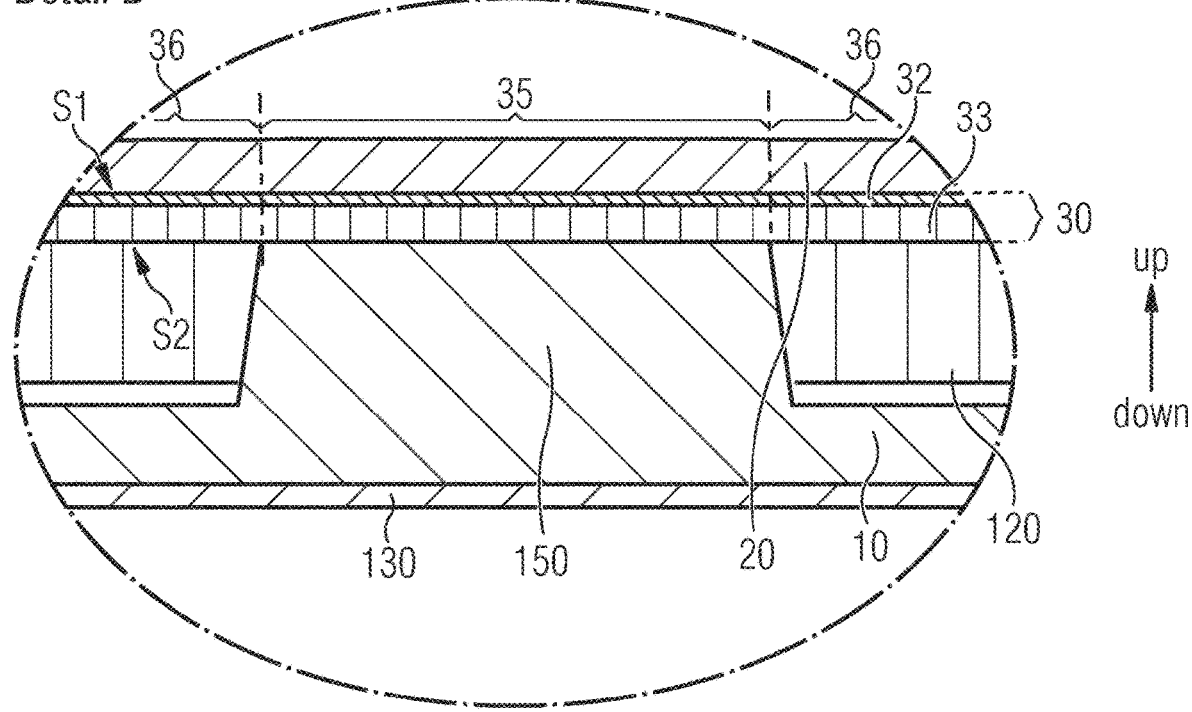
FIG. 7 is a detailed view of section D of the RFID tag 1 as marked in FIG. 6.

FIG. 7 is a detailed view of section D of the RFID tag 1 as marked in FIG. 6. The antenna unit 30 is an RFID inlay includes a substrate 33 and an antenna 32 which is edged on the substrate 33. The antenna 32 and the substrate 33 are illustrated schematically. The RFID inlay 30 is positioned between the lower housing 10 and the upper housing 20. The first portion 35 of the RFID inlay 30 is positioned above the protrusion 150 of the lower housing 10. In the area of the protrusion 150 of the lower housing 10, the antenna 32 is positioned on an upper side S1 of the RFID inlay 30 and the substrate 33 is positioned on a lower side S2 of the RFID inlay 30. The top of the protrusion 150 is attached to the first portion 35 of the RFID inlay 30. More specifically, the top of the protrusion 150 is attached to the substrate 33 of the RFID inlay 30 in the area of the first portion 35. At the bottom of the lower housing 10 an adhesive tape 130 is attached. The second portion 36 of the RFID inlay 30 is attached to the RFID inlay holder 120. More specifically, the RFID inlay 30 is attached to the substrate 33 of the RFID inlay 30 in the area of the second portion 36.

Figure 8:
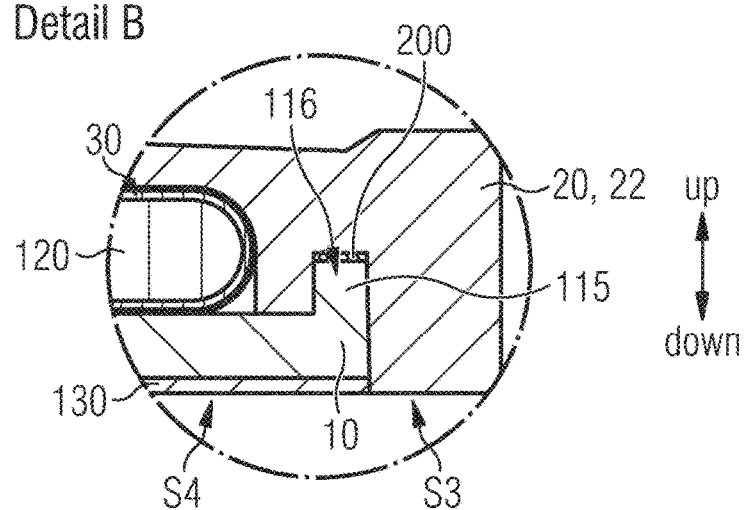
FIG. 8 is a detailed view of section B of the RFID tag 1 as marked in FIG. 6.

FIG. 8 is a detailed view of section B of the RFID tag 1 as marked in FIG. 6. The top housing 20 is positioned on top of the lower housing 10. A projection 115 of the lower housing 10 extends in a groove 116 of the upper housing 20. In the groove 116 silicone 200 is provided between the upper housing 20 and the lower housing 10. At the bottom of the lower housing 10 an adhesive tape 130 is attached. An RFID inlay 30 and an RFID inlay holder 120 are positioned between the lower housing 10 and the upper housing 20. The RFID inlay 30 is folded around the RFID inlay holder 120.

FIG. 9 is a cross-sectional view of the RFID tag 1 of FIG. 5 along line C-C. The top housing 20 is positioned on top of the lower housing 10. Between the top housing 20 and the lower housing 10 silicone 200 is provided. At the bottom of the lower housing 10 an adhesive tape 130 is attached. An RFID inlay 30 and an RFID inlay holder 120 are positioned between the lower housing 10 and the upper housing 20.

FIG. 10 is a detailed view of section E of the RFID tag 1 as marked in FIG. 9. The top housing 20 is positioned on top of the lower housing 10. Between the top housing 20 and the lower housing 10 silicone 200 is provided. At the bottom of the lower housing 10 an adhesive tape 130 is attached. An RFID inlay 30 and an RFID inlay holder 120 are positioned between the lower housing 10 and the upper housing 20. The RFID inlay holder 120 has a groove 161 for a clip 160 of the upper housing 20. The clip 160 extends in the groove 161 such that the RFID inlay holder 120 is fixed in the upper housing 20. The clip 160 and the groove 161 form a clip mechanism. The clip mechanism 160 prevents an up-down movement of the RFID inlay holder 120 in relation to the upper housing 20.

Figure 11:
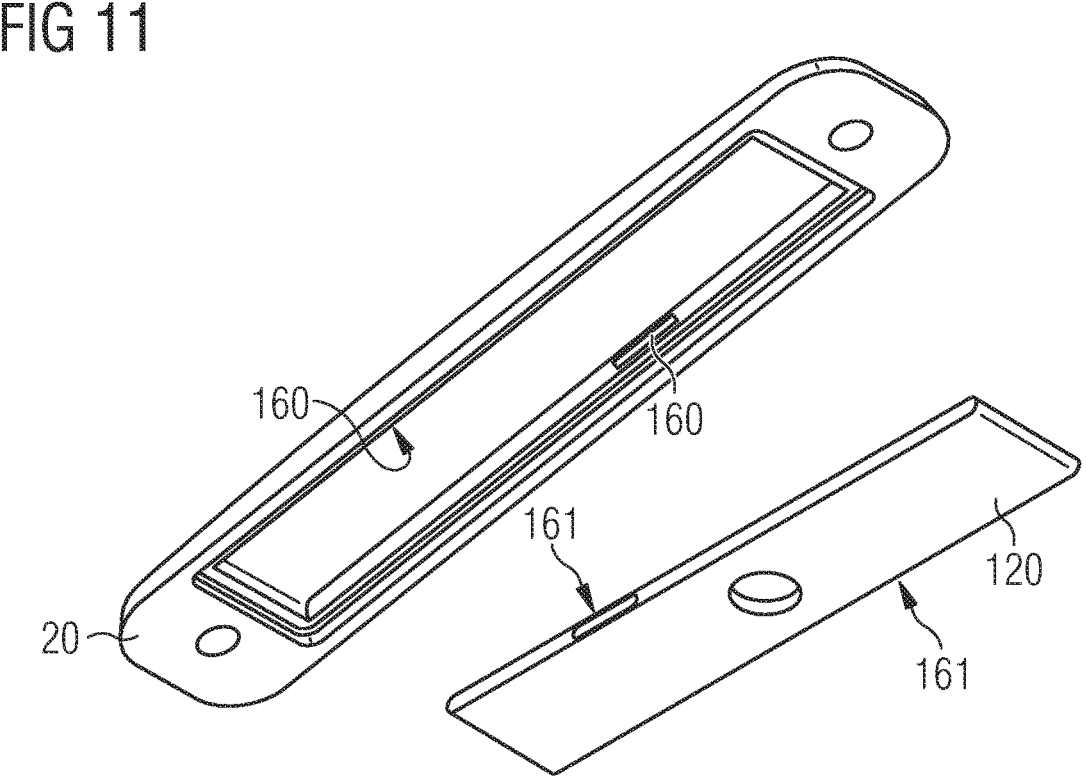
FIG. 11 is a perspective view from below on the upper housing 20 and the RFID inlay holder 120, the other components of the RFID tag 1 not being displayed.

FIG. 11 is a perspective view from below on the upper housing 20 and the RFID inlay holder 120, the other components of the RFID tag 1 not being displayed. The RFID inlay holder 120 has two grooves 161 on outer side edge surfaces. The upper housing 20 has two clips 160 on inner side edge surfaces. The grooves 161 and the clips 160 are positioned such that in the assembled state, the clips 160 and the grooves 161 form a clip mechanism wherein the clips 160 extend in the grooves 161.

Figure 12:
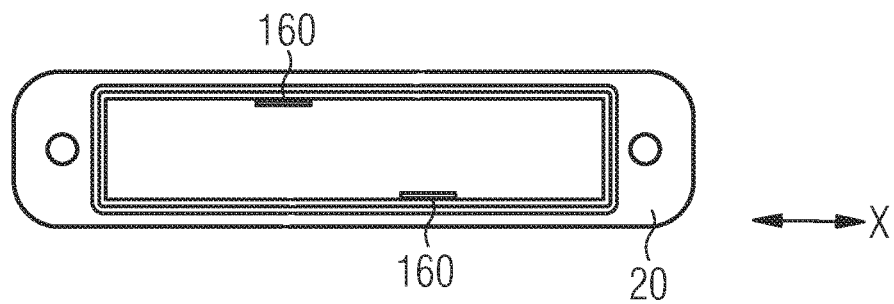
FIG. 12 is a bottom view on the top housing as illustrated in FIG. 11.

FIG. 12 is a bottom view on the top housing as illustrated in FIG. 11. The two clips 160 of the upper housing 20 are positioned on inner side edge surfaces of the upper housing 20 and are arranged offset to each other in a width direction X of the upper housing 20.

FIG. 13 illustrates three different exemplary embodiments for the form and number of protrusions 150 of the lower housing 10 in top view.

In FIG. 13 a), the lower housing 10 has one protrusion 150 and the top of the protrusion has a cylindrical surface.

In FIG. 13 b), the lower housing 10 has two protrusions 150 and the top of the protrusion have a cylindrical surface.

In FIG. 13 c), the lower housing 10 has two protrusions 150 and the top of the protrusions has a rectangular surface.

FIG. 14 is a perspective view on a damaged RFID tag 1. FIG. 12 shows a license plate 100 on which a lower housing 10 is attached. The upper housing 20 has been removed and is not illustrated. On the protrusion 150 of the lower housing 10 sticks a part of an antenna 32. The part of the antenna 32 has a meander form.

FIG. 15 illustrates three different exemplary embodiments for the form of the antenna 32 and its positioning in relation to the top of the protrusion 150 of the lower housing 10 in top view.

In FIG. 15 a), the antenna 32 enters and exits the area in which the top of the protrusion 150 is positioned three times. If the antenna enters and exits the area which is positioned above the top of the protrusion three time, this means that the antenna both enters this area three times and exits this area three times. Therefore, when viewed in top view, six bridging antenna sections 201 (marked with dots) between the antenna 32 and the area above the top of the protrusion exist.

In FIG. 15 b), the antenna 32 enters and exits the area in which the top of the protrusion 150 is positioned two times. Therefore, when viewed in top view, four bridging antenna sections 201 between the antenna 32 and the area above the top of the protrusion exist.

In FIG. 15 c), the lower housing has a first protrusion 151 and a second protrusion 152. The antenna 32 enters and exits the area in which the top of the first protrusion 151 is positioned two times. The antenna 32 enters and exits the area in which the top of the second protrusion 152 is positioned two times. Therefore, when viewed in top view, in total eight bridging antenna sections 201 between the antenna 32 and the area above the top of the first protrusion and the second protrusion exist.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. An RFID tag for a tamper proof attachment to an object, the RFID tag comprising:
    a lower housing configured to be attached to the object;
    an upper housing placed on the lower housing and comprising a peripheral portion, the peripheral portion laterally surrounding the lower housing and configured to be attached to the object; and
    an antenna unit positioned between the lower housing and the upper housing;
    wherein at least one first portion of the antenna unit is attached to the lower housing and at least one second portion of the antenna unit is attached to the upper housing such that the antenna unit is damaged when a distance between the upper housing and the lower housing changes because the at least one first portion of the antenna unit remains attached to the lower housing and the at least one second portion of the antenna unit remains attached to the upper housing.

2. The RFID tag according to claim 1, wherein the antenna unit is an RFID inlay, the RFID inlay comprising a substrate and an antenna.

3. The RFID tag according to claim 2, wherein the antenna is etched on the substrate.

4. The RFID tag according to claim 2, further comprising an adhesion reducing layer between the antenna and the substrate.

5. The RFID tag according to claim 1, further comprising a first adhesive layer positioned between the upper housing and the lower housing and attaching the upper housing to the lower housing.

6. The RFID tag according to claim 5, further comprising a second adhesive layer configured to attach the lower housing to the object.

7. The RFID tag according to claim 6, wherein the first adhesive layer and the second adhesive layer are configured such that, when the RFID tag is attached to the object, a peel strength between the lower housing and the object is larger than a peel strength between the upper housing and the lower housing.

8. The RFID tag according to claim 7, wherein a ratio of the peel strength between the lower housing and the object to the peel strength between the upper housing and the lower housing is in a range of 2 to 8.

9. The RFID tag according to claim 1, wherein each of a peel strength between the at least one first portion of the antenna unit and the lower housing and a peel strength between the at least one second portion of the antenna unit and the upper housing are greater than a breaking strength of the antenna unit such that the antenna unit breaks when the distance between the upper housing and the lower housing is increased.

10. The RFID tag according to claim 1, wherein the lower housing comprises a protrusion and a top of the protrusion is attached to the at least one first portion of the antenna unit.

11. The RFID tag according to claim 10, wherein the protrusion has a conic shape.

12. The RFID tag according to claim 10, wherein the antenna unit comprises an antenna which in a top view enters and exits an area which is positioned above the top of the protrusion at least one time and not more than two times.

13. The RFID tag according to claim 1, further comprising an RFID inlay holder, wherein:
the at least one second portion of the antenna unit is attached to the RFID inlay holder; and
the RFID inlay holder is attached to the upper housing.

14. The RFID tag according to claim 1, wherein the lower housing comprises multiple protrusions and a top of each protrusion is attached to the at least one first portion of the antenna unit.

15. The RFID tag according to claim 13, wherein the RFID inlay holder is attached to the upper housing by means of a clip mechanism.

16. The RFID tag according to claim 13, wherein the antenna unit is positioned on a top side of the RFID inlay holder, is folded at an outer edge of the RFID inlay holder, and protrudes on a lower side of the RFID inlay holder.

17. The RFID tag according to claim 13, wherein the lower housing comprises a protrusion and a top of the protrusion is attached to the at least one first portion of the antenna unit, and wherein the RFID inlay holder comprises a through hole through which the protrusion of the lower housing extends.

18. The RFID tag according to claim 17, wherein the antenna unit is attached to the RFID inlay holder and to the top of the protrusion, the top of the protrusion extending through the through hole of the RFID inlay holder.

19. The RFID tag according to claim 1, wherein the peripheral portion comprises a bottom surface with a width not smaller than 2 mm.

20. A method for providing a tamper proof attachment of an RFID tag to an object, the method comprising:
providing a lower housing configured to be attached to the object;
providing an upper housing configured to be attached to the object and to be mated with the lower housing, wherein in a mated state, the lower housing and the upper housing form an inner chamber and the upper housing laterally surrounds the lower housing;
mating the upper housing with the lower housing while positioning an antenna unit in the inner chamber between the upper housing and the lower housing and attaching at least one first portion of the antenna unit to the lower housing and at least one second portion of the antenna unit to the upper housing;
attaching the lower housing and the upper housing, between which the antenna unit is positioned, to the object such that:
when someone tries to remove the RFID tag from the object, the upper housing has to be removed before the lower housing can be removed; and
b) when the upper housing is removed from the object, a distance between the upper housing and the lower housing changes and the antenna unit breaks because the at least one first portion of the antenna unit remains attached to the lower housing and the at least one second portion of the antenna unit remains attached to the upper housing.

\* \* \* \* \*